US012476391B1

(12) United States Patent
Workman et al.

(10) Patent No.: US 12,476,391 B1
(45) Date of Patent: Nov. 18, 2025

(54) DIRECT WIRE TERMINAL ASSEMBLY

(71) Applicant: TE Connectivity Solutions GmbH, Schaffhausen (CH)

(72) Inventors: Emma L. Workman, Middletown, PA (US); David Patrick Orris, Middletown, PA (US)

(73) Assignee: TE Connectivity Solutions GmbH, Schaffhausen (CH)

(*) Notice: Subject to any disclaimer, the term of this patent is extended or adjusted under 35 U.S.C. 154(b) by 0 days.

(21) Appl. No.: 19/059,446

(22) Filed: Feb. 21, 2025

(51) Int. Cl.
*H01R 4/18* (2006.01)
*H01R 4/02* (2006.01)
*H01R 13/03* (2006.01)

(52) U.S. Cl.
CPC ............ *H01R 4/187* (2013.01); *H01R 4/023* (2013.01); *H01R 4/027* (2013.01); *H01R 4/185* (2013.01); *H01R 13/03* (2013.01)

(58) Field of Classification Search
CPC ........ H01R 4/187; H01R 4/023; H01R 4/027; H01R 4/185; H01R 13/03
USPC ........................................................ 439/877
See application file for complete search history.

(56) References Cited

U.S. PATENT DOCUMENTS 4,993,968 A * 2/1991 Guletsky .................. H01R 9/05 439/942
5,013,265 A * 5/1991 Buchter ............... H01R 25/162 439/744
7,074,075 B2 * 7/2006 Miyazawa ........... H01R 12/592 439/465
2001/0036767 A1 * 11/2001 Igarashi ............... H01R 9/0524 439/422
2002/0192998 A1 * 12/2002 Noro .................... H01R 12/594 439/497
2005/0106932 A1 * 5/2005 Miyazawa ............ H01R 13/26 439/495
2006/0240697 A1 * 10/2006 Cronch .................. H01R 12/79 439/260

FOREIGN PATENT DOCUMENTS

| | | | | | |
|---|---|---|---|---|---|
| CN | 1758492 | A | * | 4/2006 | H01R 12/592 |
| CN | 201440535 | U | * | 4/2010 | H01R 12/775 |
| CN | 203503909 | U | * | 3/2014 | |
| CN | 109792114 | A | * | 5/2019 | H01R 12/714 |
| CN | 211700677 | U | * | 10/2020 | |
| CN | 216563594 | U | * | 5/2022 | |
| EP | 385020 | A | * | 9/1990 | H01R 9/05 |
| JP | 2000260498 | A | * | 9/2000 | H01R 12/79 |
| JP | 2001143797 | A | * | 5/2001 | H01R 12/594 |
| JP | 2002008765 | A | * | 1/2002 | |
| JP | 2014202739 | A | * | 10/2014 | |

* cited by examiner

*Primary Examiner* — Peter G Leigh

(57) ABSTRACT

A terminal assembly includes a cable that includes a conductor which has at least one wire. The conductor has an outer surface. The terminal assembly includes a terminal having a main body extending between a front and a rear of the terminal. The terminal includes a wire support supporting the at least one wire of the conductor at a mating interface. The at least one wire is welded to the wire support to fix the at least one wire to the main body of the terminal. The outer surface of the conductor is exposed at the mating interface for direct mating to a mating component.

20 Claims, 11 Drawing Sheets

DIRECT WIRE TERMINAL ASSEMBLY

BACKGROUND OF THE INVENTION

The subject matter herein relates generally to electrical connectors.

Electrical connectors are used to electrically connect components. For example, the electrical connectors may include receptacle connectors, plug connectors, header connectors, and the like. The electrical connectors typically include a housing holding terminals or contacts. The contacts are mated to each other at mating interfaces to electrically connect the first and second electrical connectors. Cable connectors include cables terminated to the contacts. For example, the cables may be crimped to the contacts at a terminating end. The contacts include a mating end, opposite the terminating end, that is configured to be mated to the mating contact of the mating electrical connector. To enhance conductivity, the contacts are typically made from a highly conductive material, such as copper. The contacts are typically stamped and formed to include a particular type of mating interface, such as a pin, a socket, a spring beam, or other mating interface, which is mated to the mating contact.

Known electrical connectors are not without disadvantages. For instance, contacts made of copper tend to be more expensive than other types of contacts, which increases the overall cost of the electrical connector. Additionally, the mating ends of the contacts increase cost, such as requiring intricate stamping and forming processes and requiring additional material to form the mating interface. Additionally, conventional connectors include multiple interfaces or transitions along the transmission lines, such as at each cable to contact interface and at each contact to contact interface. Performance degradation may occur at each interface or transition.

A need remains for a cost effective and reliable electrical connector.

BRIEF DESCRIPTION OF THE INVENTION

In one embodiment, a terminal assembly is provided and includes a cable that includes a conductor which has at least one wire. The conductor has an outer surface. The terminal assembly includes a terminal having a main body extending between a front and a rear of the terminal. The terminal includes a wire support supporting the at least one wire of the conductor at a mating interface. The at least one wire is welded to the wire support to fix the at least one wire to the main body of the terminal. The outer surface of the conductor is exposed at the mating interface for direct mating to a mating component.

In another embodiment, a terminal assembly is provided and includes a cable that includes a conductor which has at least one wire. The conductor includes a front portion, a rear portion, and a mating portion between the front portion and the rear portion. The terminal assembly includes a terminal having a main body extending between a front and a rear of the terminal. The terminal includes a front weld pad welded to the front portion of the conductor and a rear weld pad welded to the rear portion of the conductor. The terminal includes a wire support supporting the mating portion of the conductor at a mating interface. The mating portion of the conductor is exposed at the mating interface for direct mating to a mating component.

In a further embodiment, an electrical connector is provided and includes a housing that has a mating end configured to be mated with a mating component and a cable end. The housing includes a contact channel therethrough. The electrical connector includes a terminal assembly coupled to the housing. The terminal assembly includes a cable and a terminal coupled to the cable. The cable includes a conductor that has at least one wire. The terminal has a main body extending between a front and a rear of the terminal. The terminal includes a wire support supporting the at least one wire of the conductor at a mating interface. The at least one wire is welded to the wire support to fix the at least one wire to the main body of the terminal. The conductor is exposed at the mating interface for direct mating to the mating component.

DETAILED DESCRIPTION OF THE INVENTION

Figure 1:
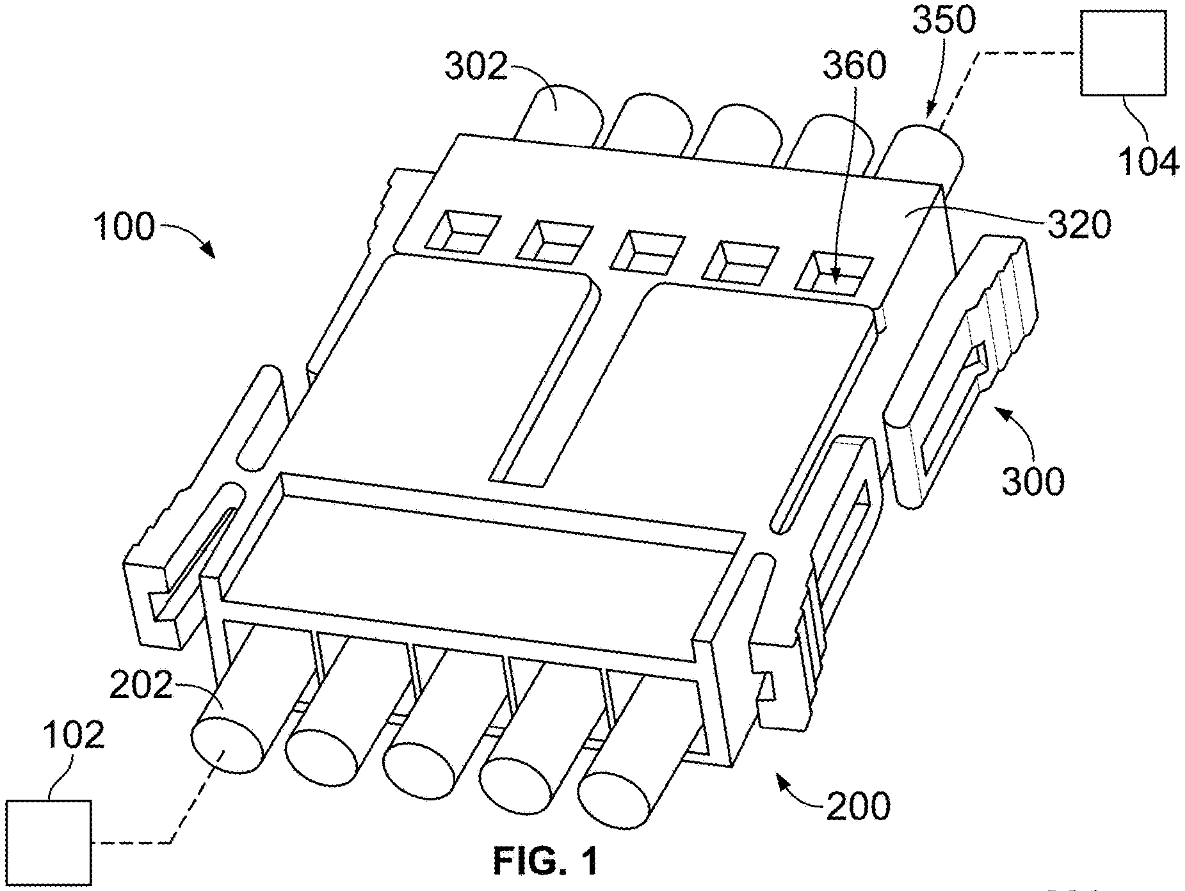
FIG. 1 illustrates an electrical connector system in accordance with an exemplary embodiment.

FIG. 1 illustrates an electrical connector system 100 in accordance with an exemplary embodiment. The electrical connector system 100 includes a first electrical connector 200 electrically connected to a first component 102 and a second electrical connector 300 electrically connected to a second component 104. The electrical connectors 200, 300 are mated at a separable mating interface. The electrical connectors 200, 300 transmit data and/or power between the first and second components 102, 104.

In an exemplary embodiment, the first electrical connector 200 is a cable connector having one or more cables 202 extending from the first electrical connector 200. In alternative embodiments, the first electrical connector 200 may be a board connector terminated to a circuit board (not shown). In alternative embodiments, in lieu of the second electrical connector 300 the first electrical connector 200 may be directly mated to a circuit board. For example, the first electrical connector 200 may be a card edge connector configured to receive an edge of a circuit board.

In an exemplary embodiment, the second electrical connector 300 is a cable connector having one or more cables 302 extending from the second electrical connector 300. In alternative embodiments, the second electrical connector 300 may be a board connector terminated to a circuit board. In alternative embodiments, in lieu of the second electrical connector 300 the second electrical connector 300 may be directly mated to a circuit board. For example, the second electrical connector 300 may be a card edge connector configured to receive an edge of a circuit board.

The second electrical connector 300 includes a housing 320 holding one or more terminal assemblies 350. Each terminal assembly 350 includes a terminal 360 terminated to an end of the corresponding cable 302. The cable 302 may be welded to the corresponding terminal 360. For example, the cable 302 may be spot welded at multiple locations along the terminal 360, such as at or near a front of the terminal 360 and/or at or near a rear of the terminal 360 and/or at or near a central portion of the terminal 360. The cable 302 may be ultrasonically welded to the terminal 360. Optionally, the conductor of the cable 302 may be a multi-strand cable wherein individual wires of the cable 302 may be welded to each other at one or more locations along the lengths of the wires. The terminal 360 provides mechanical support for the conductor of the cable 302 at a mating interface for mating with the first electrical connector 200. For example, the terminal 360 supports and positions the cable 302 at the mating interface. The conductor may be welded to the terminal 360 at the mating interface and/or forward of the mating interface and/or rearward of the mating interface. The terminal 360 may provide a normal force against the cable 302 to press the cable 302 outward at the mating interface for mating with the first electrical connector 200. In an exemplary embodiment, the conductor of the cable 302 is configured to be directly mated to the corresponding cable 202 of the first electrical connector 200. The terminal 360 may additionally or alternatively be crimped to the end of the cable 302.

In an exemplary embodiment, the first and second electrical connectors 200, 300 are identical. For example, the first and second electrical connectors 200, 300 may be mirrored mating halves of the electrical connector system 100. The second electrical connector 300 may be rotated 180° relative to the first electrical connector 200 for mating thereto. Optionally, the first and second electrical connectors 200, 300 may be hermaphroditic. The first electrical connector 200 and/or the second electrical connector 300 may include securing elements, such as latches, to secure mating between the first and second electrical connectors 200, 300.

Figure 2:
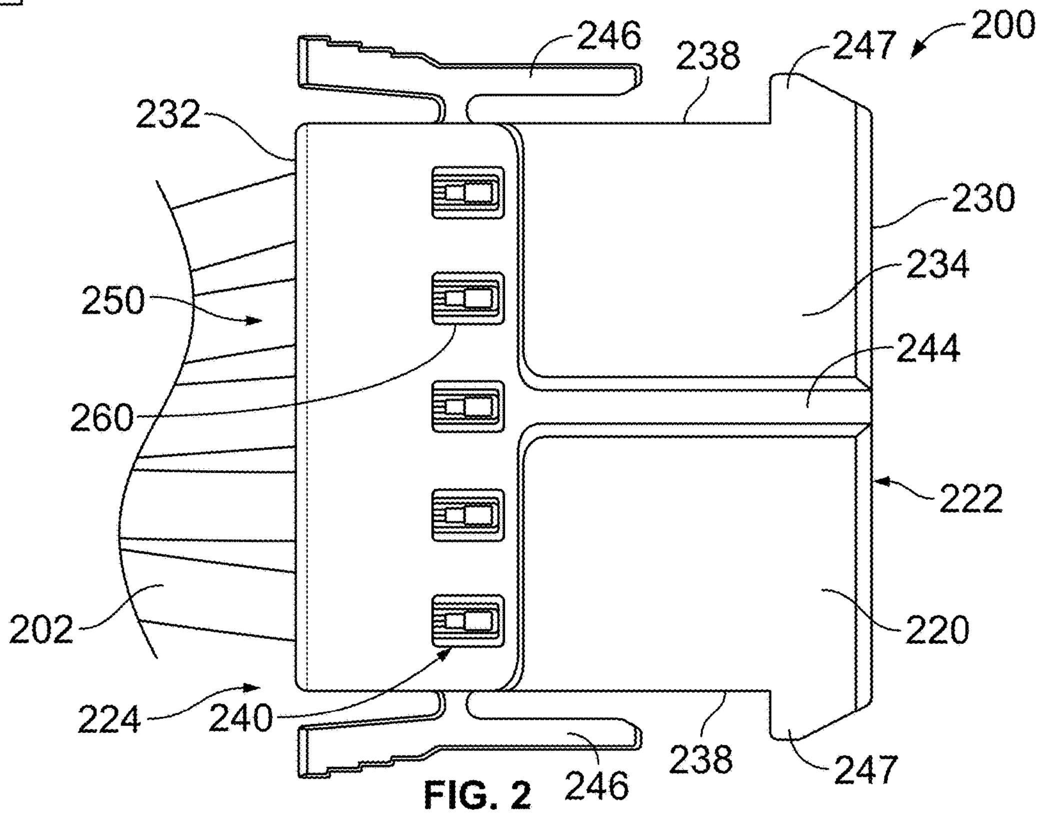
FIG. 2 is a top view of the electrical connector in accordance with an exemplary embodiment.
Figure 3:
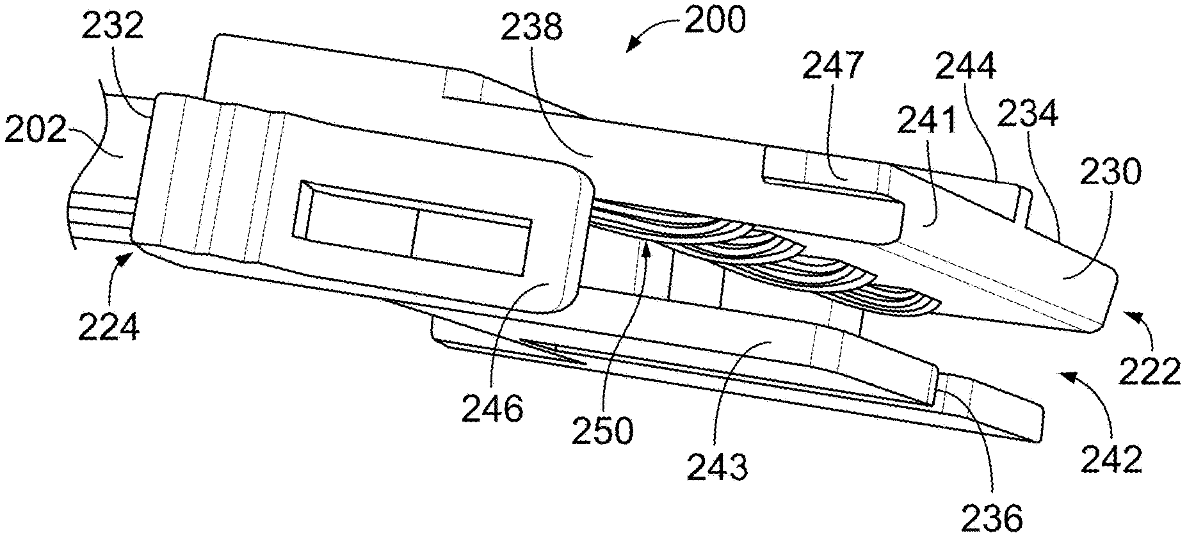
FIG. 3 is a perspective view of the electrical connector in accordance with an exemplary embodiment.
Figure 4:
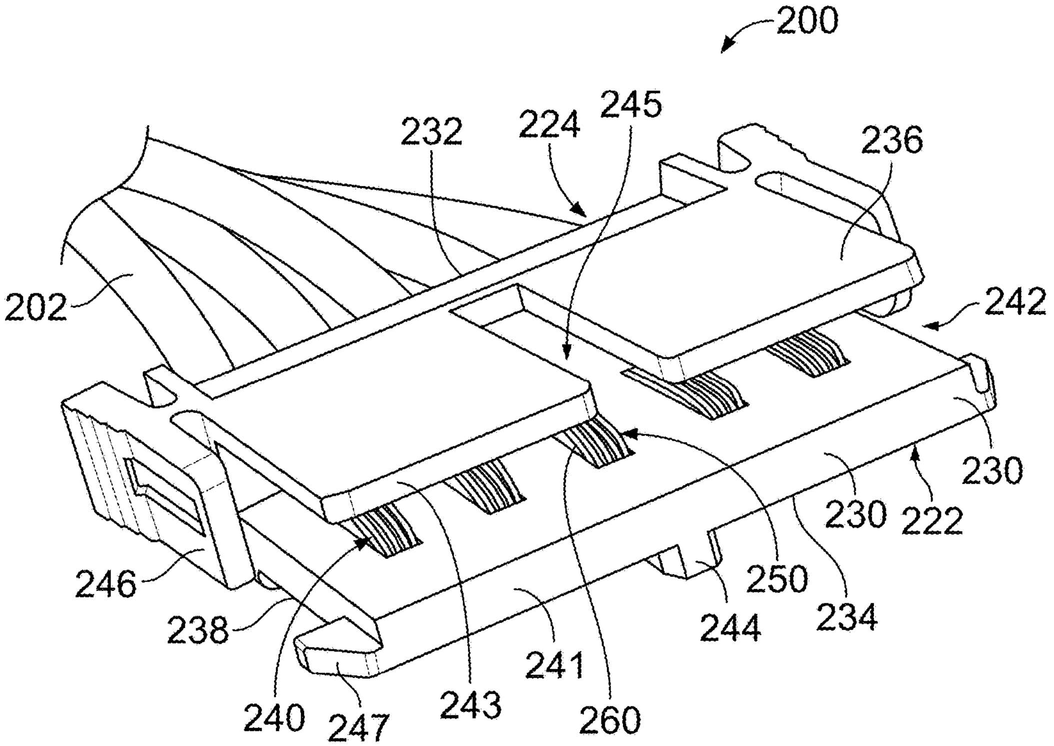
FIG. 4 is a bottom perspective view of the electrical connector in accordance with an exemplary embodiment.
Figure 5:
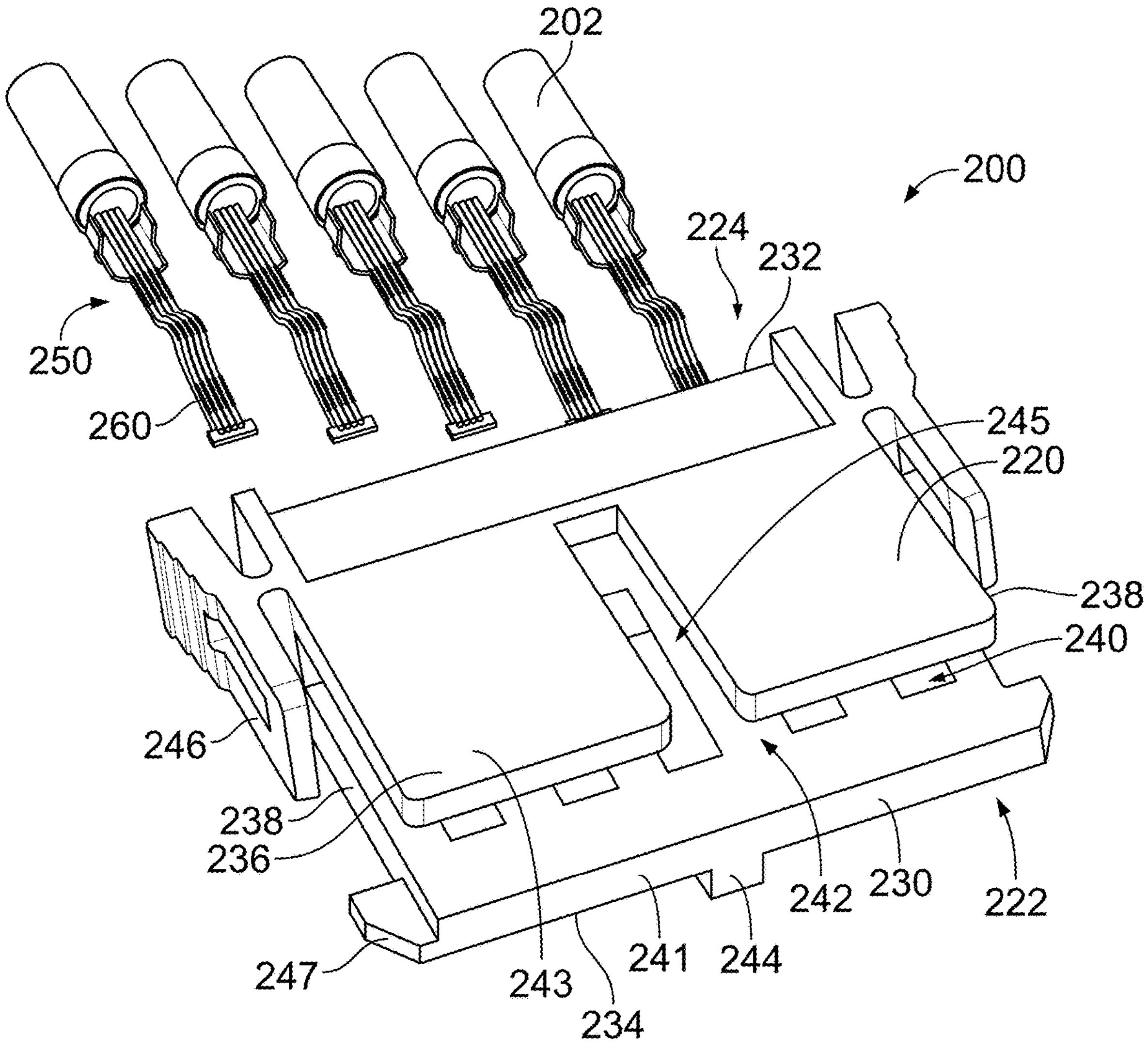
FIG. 5 is an exploded, bottom perspective view of the electrical connector in accordance with an exemplary embodiment.

FIG. 2 is a top view of the electrical connector 200 in accordance with an exemplary embodiment. FIG. 3 is a perspective view of the electrical connector 200 in accordance with an exemplary embodiment. FIG. 4 is a bottom perspective view of the electrical connector 200 in accordance with an exemplary embodiment. FIG. 5 is an exploded, bottom perspective view of the electrical connector 200 in accordance with an exemplary embodiment.

The electrical connector 200 includes a housing 220 holding one or more terminal assemblies 250. In the illustrated embodiment, the electrical connector 200 includes five terminal assemblies 250 arranged in a single row. The electrical connector 200 may include greater or fewer terminal assemblies 250 in alternative embodiments. The terminal assemblies 250 may be arranged in multiple rows in alternative embodiments, such as an upper row and a lower row. Each terminal assembly 250 includes a terminal 260 and the corresponding cable 202. The terminal 260 is terminated to the end of the cable 202 and provides support for the end of the cable 202 for mating with the mating component (for example, the second electrical connector 300).

In an exemplary embodiment, the terminal assembly 250 is a direct wire terminal assembly wherein the wire(s) of the cable 202 are configured to be directly terminated to the mating component. For example, the wire(s) define mating interfaces configured to interface directly with the mating component (for example, directly to the wires of the cable 302 of the corresponding terminal assembly of the second electrical connector 300). In an exemplary embodiment, the electrical connector system 100 provides a direct wire-to-wire, separable mating interface between the first and second electrical connectors 200, 300. In alternative embodiments, the electrical connector system 100 provides a direct wire-to-board, separable mating interface between the wires of the cable 202 and contact pads of the circuit board mated with the first electrical connector 200.

The housing 220 is manufactured from a dielectric material, such as a plastic material. Optionally, the housing 220 may be a molded part. The housing 220 extends between a mating end 222 and a cable end 224. The cables 202 extend from the cable end 224. In the illustrated embodiment, the cable end 224 opposite the mating end 222 (for example, at the rear and the front, respectively). In alternative embodiments, the housing 220 may be a right angle housing having the cable end 224 perpendicular to the mating end 222 (for example, at the bottom and the front, respectively).

In an exemplary embodiment, the housing 220 is rectangular. The housing 220 includes a front 230, a rear 232, a top 234, a bottom 236, and sides 238 between the top 234 and the bottom 236 and/or between the front 230 and the rear 232. The housing 220 may have other shapes in alternative embodiments. In an exemplary embodiment, the housing 220 has a low-profile. For example, the housing 220 has a short height between the top 234 and the bottom 236. In an exemplary embodiment, the mating end 222 is provided at the front 230 and the cable end 224 is provided at the rear 232. Other orientations are possible in alternative embodiments.

The housing 220 includes one or more terminal channels 240 that receive the corresponding terminal assemblies 250. In the illustrated embodiment, the housing 220 includes five terminal channels 240. However, the housing 220 may include greater or fewer terminal channels 240 in alternative embodiments. In the illustrated embodiment, the terminal channels 240 extend between the front 230 and the rear 232. For example, the terminal channel 240 may be open at the front 230 and/or open at the rear 232 to receive the terminal assemblies 250. In the illustrated embodiment, the cables 202 extend from the terminal channels 240 at the rear 232.

In an exemplary embodiment, the housing 220 includes a mating slot 242 at the front 230. In the illustrated embodiment, the mating slot 242 extends between the sides 238. An upper wall 241 may be located between the top 234 and the mating slot 242 and/or a lower wall 243 may be located between the bottom 236 and the mating slot 242. The upper wall 241 may house the terminal assemblies 250. In an exemplary embodiment, the upper wall 241 is configured to be plugged into the mating slot of the second electrical connector 300 during mating. The mating slot 242 is configured to receive the mating component (for example, the second electrical connector 300 or a circuit board). The terminal assemblies 250 are exposed in the mating slot 242 for mating with the mating component. For example, the terminal channels 240 may be open to the mating slot 242 to expose the mating ends of the terminal assemblies 250.

In alternative embodiments, rather than an elongated mating slot, the housing 220 may include individual mating cavities housing the corresponding terminal assemblies 250 that receive the corresponding mating terminal assemblies of the mating component. For example, the mating slot 242 may be divided by separating walls to form the individual mating cavities.

In an exemplary embodiment, the housing 220 includes guide features to guide mating with the second electrical connector 300. In the illustrated embodiment, the guide features include a guide rail 244 on the upper wall 241 and a guide slot 245 on the lower wall 243. The guide rail 244 is configured to be plugged into a guide slot in the housing of the second electrical connector 300. The guide slot 245 is configured to receive a guide rail of the housing of the second electrical connector 300. Other types of guide features may be used in alternative embodiments. In the illustrated embodiment, the guide features are centered on the housing 220. Other locations are possible in alternative embodiments. The guide features may define keying features for keyed mating with the second electrical connector 300.

In an exemplary embodiment, the housing 220 includes securing features for secure mating with the second electrical connector 300. In the illustrated embodiment, the securing features include latches 246 on the sides 238 and/or catches 247 on the sides 238. The latches 246 are deflectable. The latches 246 are configured to interface with the corresponding catches on the housing of the second electrical connector 300. The catches 247 are configured to interface with latches of the second electrical connector 300. Other types of securing features may be used in alternative embodiments. The securing features may be located at other locations in alternative embodiments, such as at the top 234 and/or the bottom 236.

Figure 6:
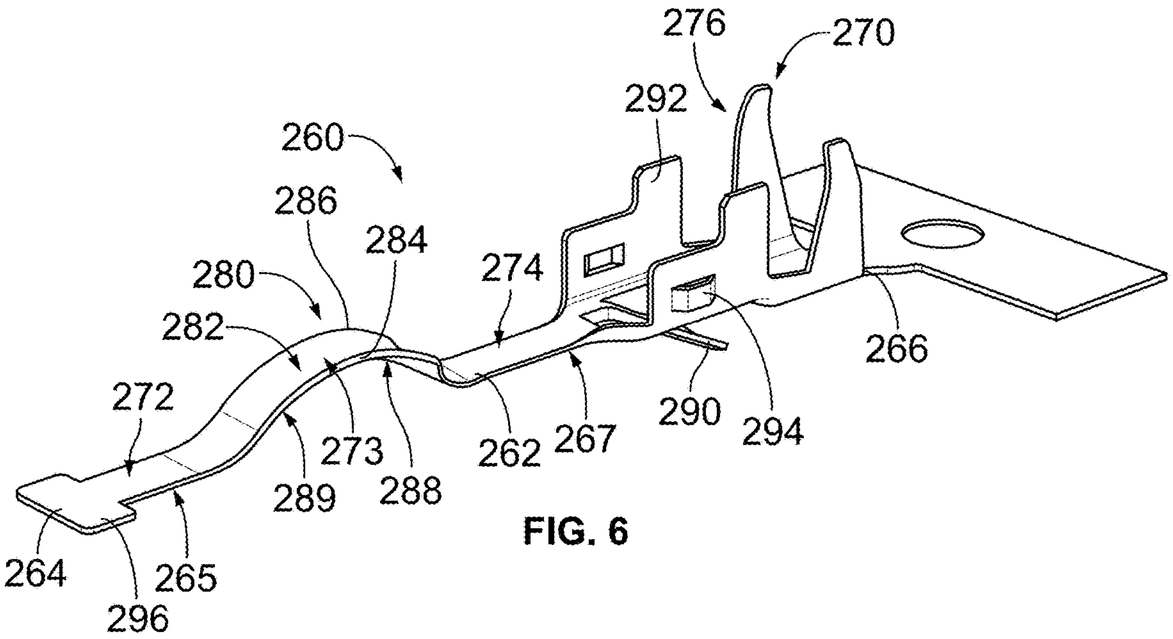
FIG. 6 illustrates the terminal of the terminal assembly accordance with an exemplary embodiment.
Figure 7:
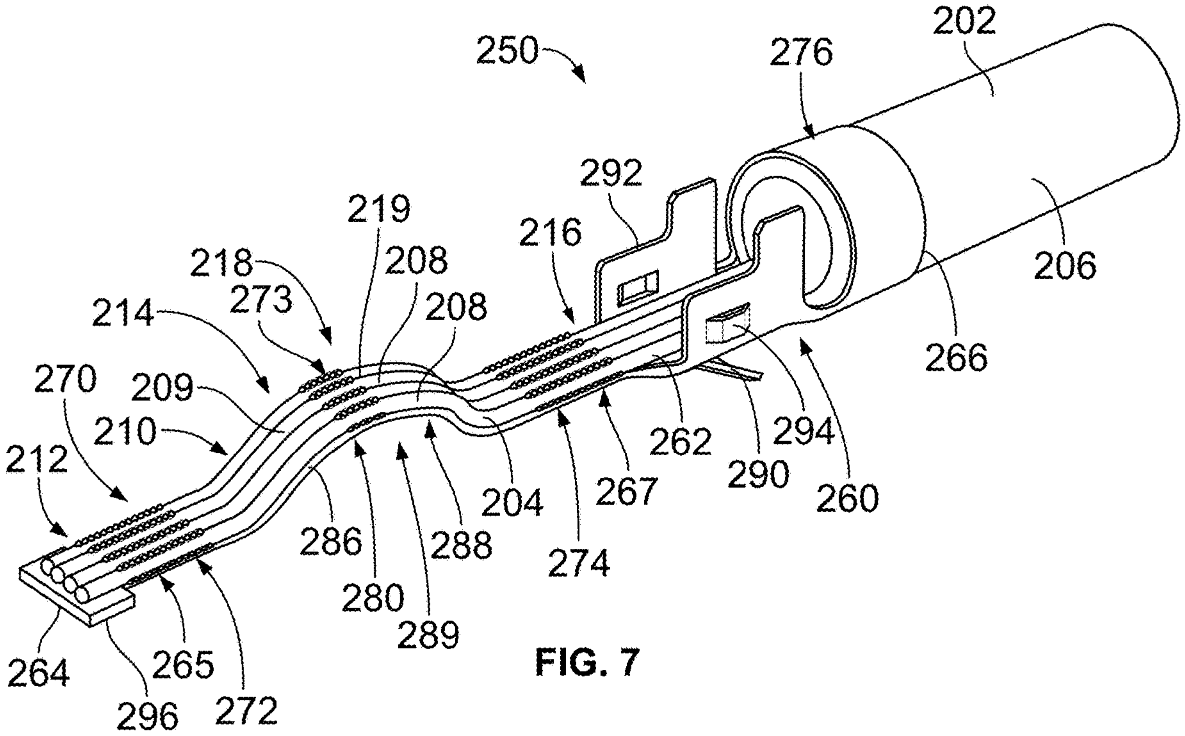
FIG. 7 is a front perspective view of the terminal assembly in accordance with an exemplary embodiment showing the terminal connected to the end of the cable.
Figure 8:
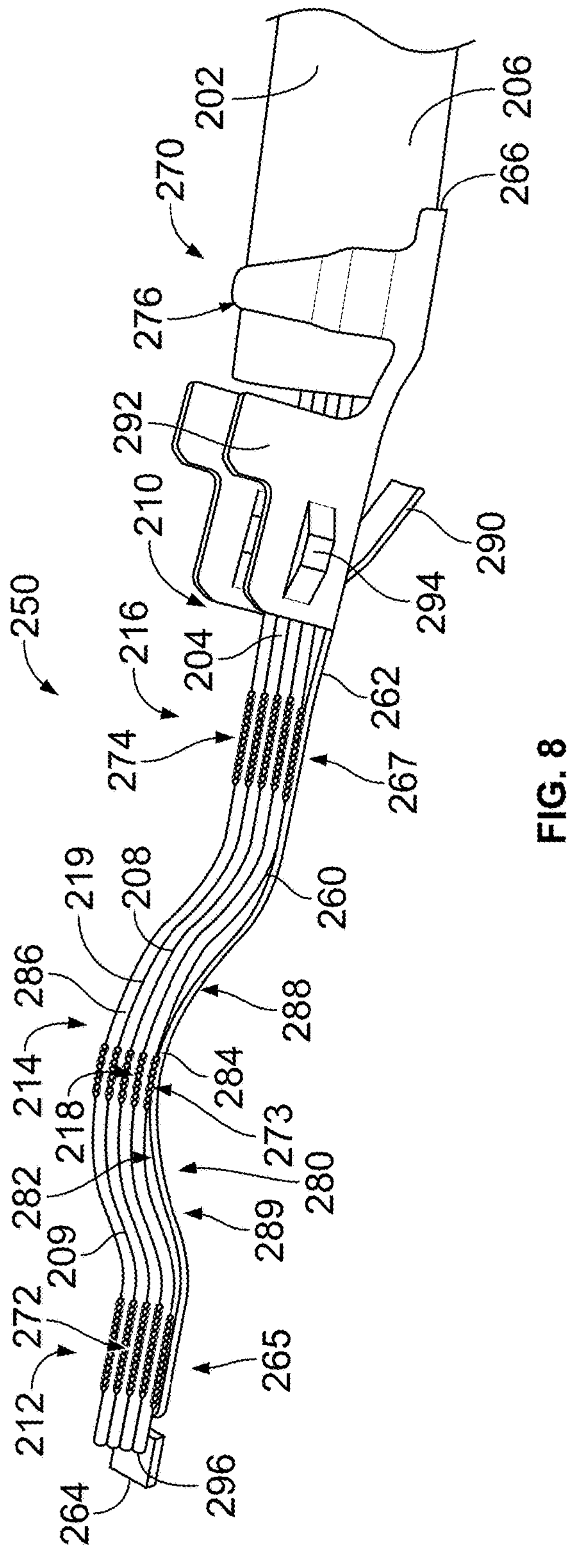
FIG. 8 is a rear perspective view of the terminal assembly in accordance with an exemplary embodiment showing the terminal connected to the end of the cable.
Figure 9:
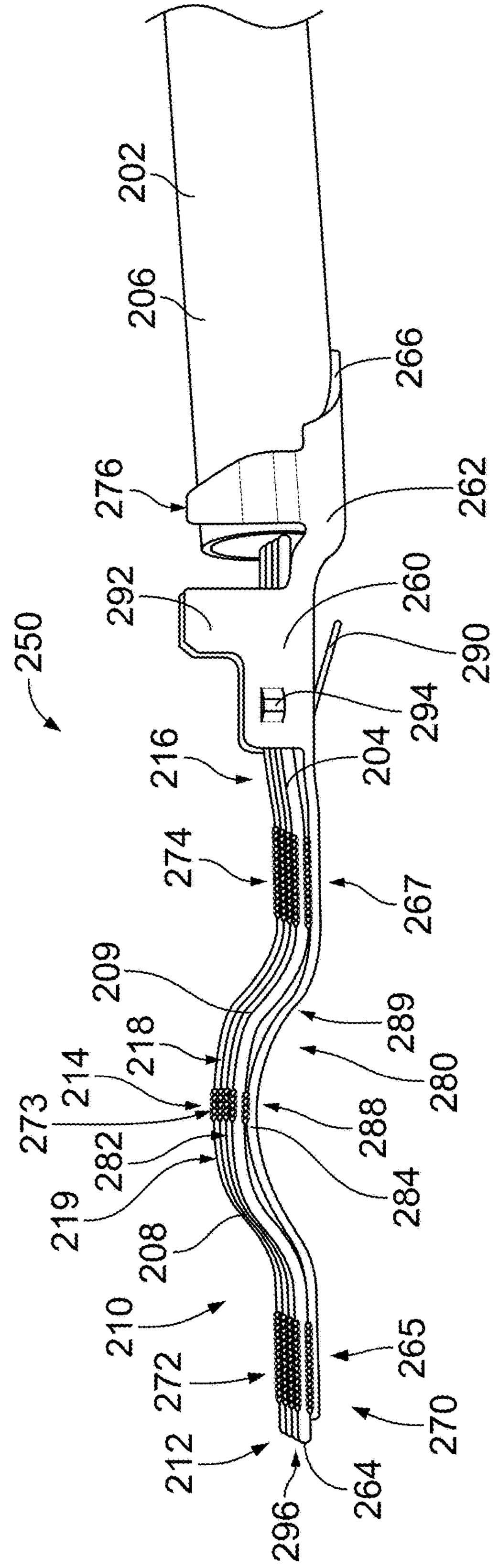
FIG. 9 is a side view of the terminal assembly in accordance with an exemplary embodiment showing the terminal connected to the end of the cable.

FIG. 6 illustrates the terminal 260 of the terminal assembly 250 accordance with an exemplary embodiment. FIG. 7 is a front perspective view of the terminal assembly 250 in accordance with an exemplary embodiment showing the terminal 260 connected to the end of the cable 202. FIG. 8 is a rear perspective view of the terminal assembly 250 in accordance with an exemplary embodiment showing the terminal 260 connected to the end of the cable 202. FIG. 9 is a side view of the terminal assembly 250 in accordance with an exemplary embodiment showing the terminal 260 connected to the end of the cable 202.

The cable 202 includes a conductor 204 and an insulator 206 surrounding the conductor 204. The insulator 206 may define an outer jacket of the cable 202. In alternative embodiments, the insulator 206 may be an inner layer of the cable 202 having a cable shield and an outer jacket surrounding the insulator 206. In an exemplary embodiment, the conductor 204 is a multi-stranded conductor having a plurality of wire strands or wires 208 forming the conductor 204. The wires 208 may be copper or copper alloy wires or other highly conductive metal wires, such as aluminum or aluminum alloy or pre-tinned wires. The wires 208 are arranged in a bundle. The bundle of the wires 208 may have one or more rows and/or one or more columns of the wires 208. The wires 208 may be internested with each other within the bundle, such as having wires from different rows laying in the grooves or spaces formed between the adjacent wires 208 in the bundle. The wires 208 may be twisted along the length of the cable 202. The cable 202 may have any number of wires 208, wherein the number of the wires 208 may depend on the gauge of the wire. For example, the cable 202 may be a twenty (20) gauge wire having ten (10) wire strands 208. In other various embodiments, the cable 202 may be a twenty-two (22) gauge wire having seven (7) wire strands 208. Larger or smaller gauge cables may be used in alternative embodiments. In other various embodiments, the cable 202 may include a solid core conductor 204 having a single wire 208.

In an exemplary embodiment, the cable 202 is prepared by removing a portion of the insulator 206 to form an exposed portion 210 of the conductor 204. The exposed portion 210 of the conductor 204 is provided at the end of the cable 202. The exposed portion 210 of the conductor 204 is configured to be directly electrically connected to the mating component (for example, the second electrical connector 300). The exposed portion 210 of the conductor 204 includes a front portion 212, a rear portion 216, and a mating portion 214 between the front portion 212 and the rear portion 216. The front and rear portions 212, 216 are connected to the terminal 260. For example, the front and rear portions 212, 216 may be welded to the terminal 260. The front and rear portions 212, 216 may be ultrasonically welded or laser welded to the terminal 260. In other embodiments, the front and rear portions 212, 216 may be soldered to the terminal 260. The mating portion 214 may be connected to the terminal 260. For example, the mating portion 214 may be welded to the terminal 260. The mating portion 214 may be ultrasonically welded or laser welded to the terminal 260. In other embodiments, the mating portion 214 may be soldered to the terminal 260. The mating portion 214 is configured to be directly electrically connected to the mating component. For example, the mating portion 214 defines a mating interface 218 (for example, at an outer surface 219 of the conductor 204) of the conductor 204. The mating interface 218 is defined by the outer surface(s) 209 of one or more of the wires 208. For example, the top edges of the outer most wires 208 may define the mating interface 218. In an exemplary embodiment, multiple wires 208 are provided at and define the mating interface 218.

In an exemplary embodiment, the terminal 260 is a stamped and formed part. The terminal 260 may be stamped from a piece of sheet metal and formed into a predetermined shape to receive the end of the cable 202. Optionally, a plurality of the terminals 260 may be stamped with a carrier strip and later singulated (for example, cut) from the carrier strip. The terminal 260 is configured to be terminated to the end of the cable 202, such as being welded (for example, ultrasonically welded or laser welded) to the end of the cable 202. The terminal 260 may additionally or alternatively be crimped to the end of the cable 202.

The terminal 260 includes a main body 262 extending between a front 264 and a rear 266 of the terminal 260. The terminal 260 includes other features stamped with and extending from the main body 262, such as for welding to the cable 202, locating the terminal 260 in the housing 220, or other features. In an exemplary embodiment, the main body 262 includes a front base 265 and a rear base 267, spaced apart from each other, such as proximate to the front 264 and the rear 266, respectively. The front and rear bases 265, 267 may be coplanar with each other. However, the front and rear bases 265, 267 may be offset (for example, vertically offset) in alternative embodiments. The front base 265 supports the front portion 212 of the conductor 204. The front base 265 may form a weld pad. The front portion 212 may be welded to the front base 265. The rear base 267 supports the rear portion 216 of the conductor 204. The rear base 267 may form a weld pad. The rear portion 216 may be welded to the rear base 267.

In an exemplary embodiment, the terminal 260 is used for mechanical support of the cable 202, such as to position the conductor 204 of the cable 202 for direct mating with the mating component. For example, the terminal 260 supports and positions the cable 202 at the mating interface. The terminal 260 may provide a normal force against the cable 202 to press the cable 202 outward at the mating interface for mating with the second electrical connector 300. The terminal 260 itself is not used for electrical mating with the mating component. Rather, the conductor 204 of the cable 202 is configured to be directly mated with the mating component. As such, the terminal 260 can be manufactured from less expensive materials compared to conventional terminals having mating contacts integrated into the terminal 260.

In an exemplary embodiment, the terminal 260 is manufactured from a stainless steel material. The stainless steel material is less expensive than copper or aluminum material that is typical of electrical terminals. In an exemplary embodiment, the terminal 260 has a conductivity of less than $3.0\times10^7$ S/m at 20° C., whereas the conductor 204, which defines the electrical mating interface that is mated to the mating component, has a conductivity of greater than $3.0\times10^7$ S/m at 20° C., such as greater than $5.0\times10^7$ S/m at 20° C. (for example, copper conductors may have a conductivity of approximately $5.96\times10^7$ S/m at 20° C.). In an exemplary embodiment, the terminal 260 may have a conductivity of less than 30 IACS (International Annealed Copper Standard). For example, the terminal 260 may be a stainless steel terminal having a conductivity of less than 3.0 IACS. In contrast, the conductor 204, which defines the electrical mating interface that is mated to the mating component, may include copper wires having a conductivity of approximately 100 IACS or an aluminum or aluminum alloy having a conductivity of between approximately 40-60 IACS.

The terminal 260 includes one or more connecting elements 270 configured to be mechanically connected to the cable 202. In an exemplary embodiment, the connecting elements 270 include a front weld pad 272 and a rear weld pad 274. The front weld pad 272 is located proximate to the front 264 of the terminal 260. For example, the front weld pad 272 is provided at or extends from the front base 265. The front weld pad 272 is configured to receive, and be welded to, the front portion 212 of the conductor 204. For example, the front weld pad 272 may include a flat pad and/or sides that form a trough to support and hold the bundle of the wires 208 to support the wires 208 at the front weld pad 272. The rear weld pad 274 is located rearward of the front weld pad 272, such as proximate to the rear 266. For example, the rear weld pad 274 is provided at or extends from the rear base 267. The rear weld pad 274 is configured to receive, and be welded to, the rear portion 216 of the conductor 204. For example, the rear weld pad 274 may include a flat pad and/or sides that form a trough to support and hold the bundle of the wires 208 to support the wires 208 at the rear weld pad 274. In an exemplary embodiment, the connecting elements 270 include a central weld pad 273 between the front and rear weld pads 272, 274. The central weld pad 273 is configured to receive, and be welded to, the mating portion 214 of the conductor 204. For example, the central weld pad 273 may include a flat pad and/or sides that form a trough to support and hold the bundle of the wires 208 to support the wires 208 at the central weld pad 273.

In an exemplary embodiment, the connecting elements 270 may include crimp arms 276 configured to be crimped to the cable 202. For example, the crimp arms 276 may form an insulation crimp configured to be crimped to the insulator 206. The insulation crimp is located rearward of the rear weld pad 274. The insulation crimp may be located at or proximate to the rear 266 of the terminal 260. The insulation crimp may include opposing crimp arms that are crimped around the insulator 206 to surround and/or compress the insulator 206. The crimp arms 276 may be provided at the front base 265 and/or the rear base 267 to crimp to the front portion 212 and/or the rear portion 216 of the conductor.

The terminal 260 includes a wire support 280 supporting the wire(s) 208 of the conductor 204, such as at the front base 265 and/or the rear base 267 and/or at the mating interface 218. In an exemplary embodiment, the wire support 280 extends between the front and the rear bases 265, 267 of the main body 262. The wire support 280 may be welded to the wires 208, such as at the front base 265 and/or the rear base 267 and/or the central weld pad 273. The wire support 280 supports the conductor 204 for direct mating with the second electrical connector 300 (for example, to the mating interface of the conductor of the corresponding terminal assembly of the second electrical connector 300 or to a contact pad of a circuit board). The outer surface of the conductor 204 (for example, the outer surfaces of the outer most wires 208) is exposed at the mating interface for direct mating to a mating component. The front weld pad 272 supports the front portion 212 of the conductor 204 forward of the mating interface 218 (for example, forward of the wire support 280) and the rear weld pad 274 supports the rear portion 216 of the conductor 204 rearward of the mating interface 218 (for example, rearward of the wire support 280). The central weld pad 273 supports the mating portion 214.

In an exemplary embodiment, the wire support 280 includes a trough 282 with curved side walls 284, 286 on opposite sides of the trough 282. The side walls 284, 286 hold the wire(s) 208 in the trough 282. The wire support 280 provides a backing surface for the wires 208 (for example, above or below the wires 208). The wire support 280 provides a rigid surface to support the wires 208. In an exemplary embodiment, the wire support 280 includes an elevated platform 288 supporting the conductor 204 at an elevated position relative to the front base 265 and the rear base 267. The elevated platform 288 may form the central weld pad 273. The elevated platform 288 is non-coplanar with the front base 265 and the rear base 267. In an exemplary embodiment, the wire support 280 includes an arch 289 forming the elevated platform 288. The arch 289 is located between the front weld pad 272 in the rear weld pad 274. The arch 289 supports the wire(s) 208. The arch 289 has an arcuate shape. Other shapes are possible in alternative embodiments, such as trapezoidal shaped, rectangular shaped, or other shapes. In an exemplary embodiment, the arch 289 supports and positions the cable 202 at the mating interface. The arch 289 may provide a normal force pressing outward against the cable 202 to press the cable 202 outward at the mating interface for mating with the second electrical connector 300. For example, the arch 289 provides mechanical support for the cable 202. In various embodiments, the arch 289 may be flexible and is configured to be partially compressed or deflected inward when the terminal assembly 250 is mated to the terminal assembly of the second electrical connector 300 to create an internal biasing force configured to bias the cable 202 outward at the mating interface for direct interfacing with the cable 302 of the second electrical connector 300. In various embodiments, the elevated platform 288 may include a flat portion to hold the wires 208 and define a flat mating interface. For example, the conductor 204 may include a flat mating interface for mating with the mating component. The flat portion may form the central weld pad 273.

In an exemplary embodiment, the terminal 260 includes a retention latch 290 used to retain the terminal 260 in the housing 220. The retention latch 290 extends from the main body 262. In the illustrated embodiment, the retention latch 290 is located proximate to the rear 266. Other locations are possible in alternative embodiments.

In an exemplary embodiment, the terminal 260 includes side walls 292 extending from opposite sides of the main body 262. The side walls 292 may be used to gather and position the wires 208 relative to the main body 262. In the illustrated embodiment, the side walls 292 are parallel to each other. Other orientations are possible in alternative embodiments. The side walls 292 may be used for locating the terminal 260 in the housing 220. In an exemplary embodiment, the side walls 292 include alignment features 294 for aligning the terminal 260 in the housing 220. In the illustrated embodiment, the side walls 292 are located proximate to the rear 266. Other locations are possible in alternative embodiments.

In an exemplary embodiment, the terminal 260 includes a front alignment feature 296 at the front 264 of the terminal 260. The front alignment feature 296 is used to align the terminal 260 in the housing 220. In the illustrated embodiment, the front alignment feature 296 includes alignment tabs extending from the sides of the front base 265. The alignment tabs may be coplanar with the front base 265. Other types of alignment features may be used in alternative embodiments.

Figure 10:
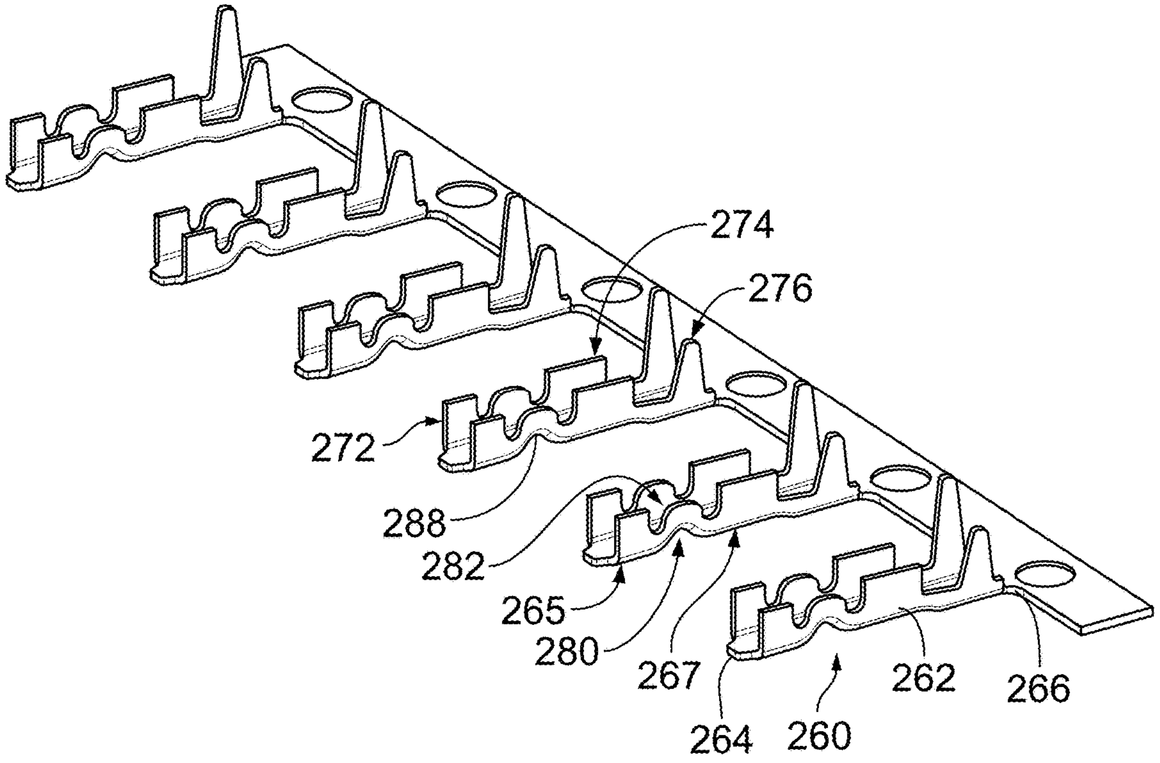
FIG. 10 illustrates a plurality of the terminal on a carrier strip in accordance with an exemplary embodiment.
Figure 11:
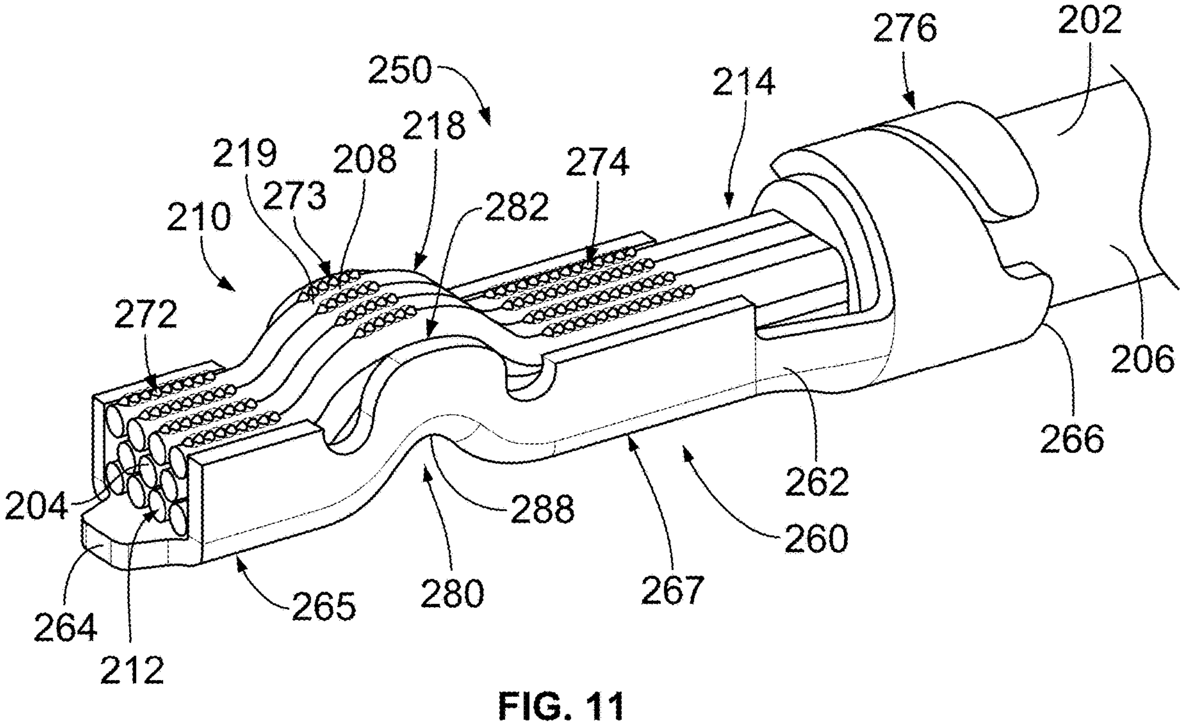
FIG. 11 is a front perspective view of the terminal assembly in accordance with an exemplary embodiment showing the terminal connected to the end of the cable.

FIG. 10 illustrates a plurality of the terminal 260 on a carrier strip in accordance with an exemplary embodiment. FIG. 11 is a front perspective view of the terminal assembly 250 in accordance with an exemplary embodiment showing the terminal 260 connected to the end of the cable 202. FIG. 11 shows the terminal 260 welded to the conductor 204 of the cable 202. In an exemplary embodiment, the conductor 204 is a multi-stranded conductor having a plurality of the wires 208 forming the conductor 204. The wires 208 are arranged in the bundle, such as in multiple layers. The exposed portion 210 of the conductor 204 is received in the terminal 260 and positioned for mating with the conductor 304 of the second electrical connector 300.

The terminal 260 is a stamped from a piece of sheet metal and formed into a predetermined shape to receive the end of the cable 202. The terminal 260 includes the main body 262 extending between the front 264 and the rear 266 of the terminal 260. The main body 262 includes the front base 265 and the rear base 267. The wire support 280 is located between the front and rear bases 265, 267. The terminal 260 provides mechanical support of the cable 202, such as to position the conductor 204 of the cable 202 for direct mating with the mating component. The front weld pad 272 is provided at the front base 265 and is welded to the front portion 212 of the conductor 204. For example, the individual wires 208 may be welded together to each other and welded to the terminal 260 at the front weld pad 272. The rear weld pad 274 is provided at the rear base 267 and is welded to the rear portion 216 of the conductor 204. For example, the individual wires 208 may be welded together to each other and welded to the terminal 260 at the rear weld pad 274. The insulation crimp 276 is crimped to the insulator 206.

The wire support 280 supports the conductor 204 at the mating interface 218 for direct mating with the second electrical connector 300 (for example, to the mating interface of the conductor of the corresponding terminal assembly of the second electrical connector 300 or to a contact pad of a circuit board). In an exemplary embodiment, the central weld pad 273 is provided along the wire support 280 to weld to the mating portion 214 of the conductor 204. For example, the individual wires 208 may be welded together to each other and welded to the terminal 260 at the central weld pad 273. In alternative embodiments, the mating portion 214 of the conductor 204 may be free supported (without being welded) between the front and rear weld pads 272, 274. The outer surface 219 of the conductor 204 (for example, the outer surfaces of the outer most wires 208) is exposed at the mating interface for direct mating to a mating component. The arch 289 of the wire support 280 is located between the front weld pad 272 in the rear weld pad 274. The arch 289 provides a rigid surface to support the wires 208, such as in the trough 282 at the elevated platform 288.

Figure 12:
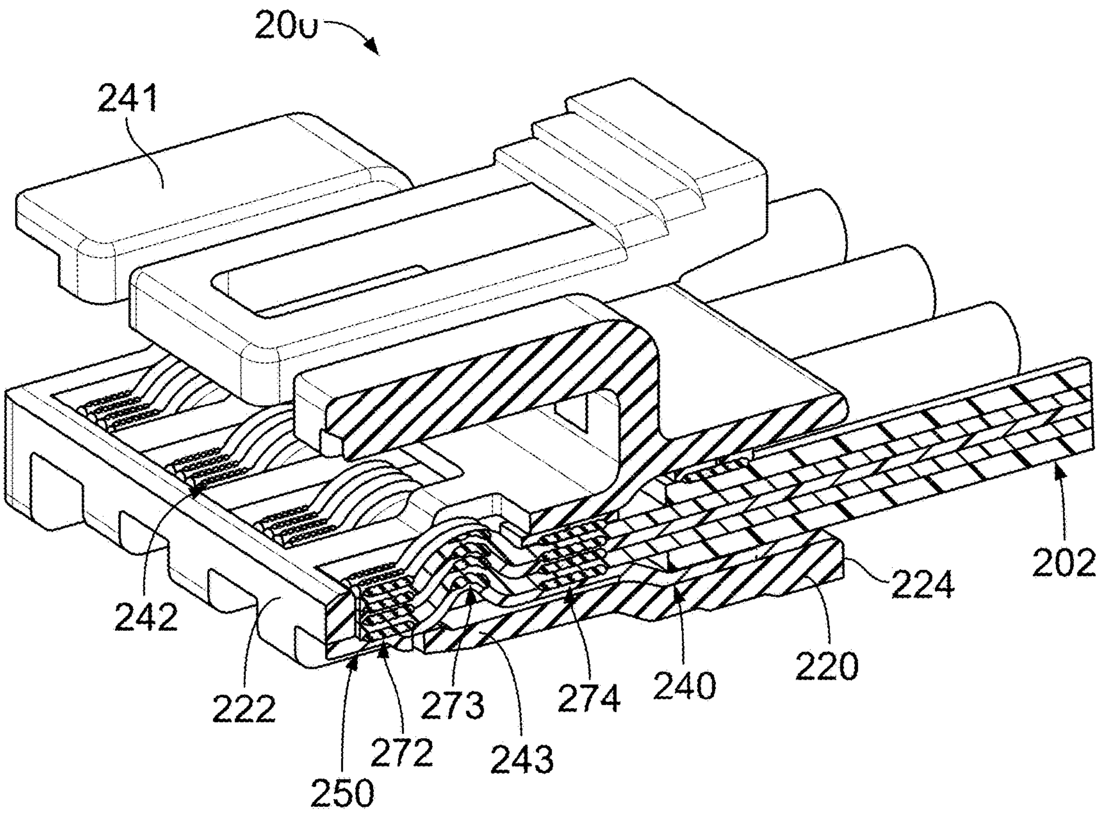
FIG. 12 is a sectional view of the first electrical connector in accordance with an exemplary embodiment.

FIG. 12 is a sectional view of the first electrical connector 200 in accordance with an exemplary embodiment. The electrical connector 200 includes the housing 220 holding the terminal assemblies 250 in the terminal channels 240. The housing 220 extends between the mating end 222 and the cable end 224 with the cables 202 extending from the cable end 224. The housing 220 includes the mating slot 242 at the mating end 222 (for example, the front) between the upper wall 241 and the lower wall 243. The terminal assemblies 250 are exposed in the mating slot 242 for mating with the mating component. The lower wall 243 may house the terminal assemblies 250.

Figure 13:
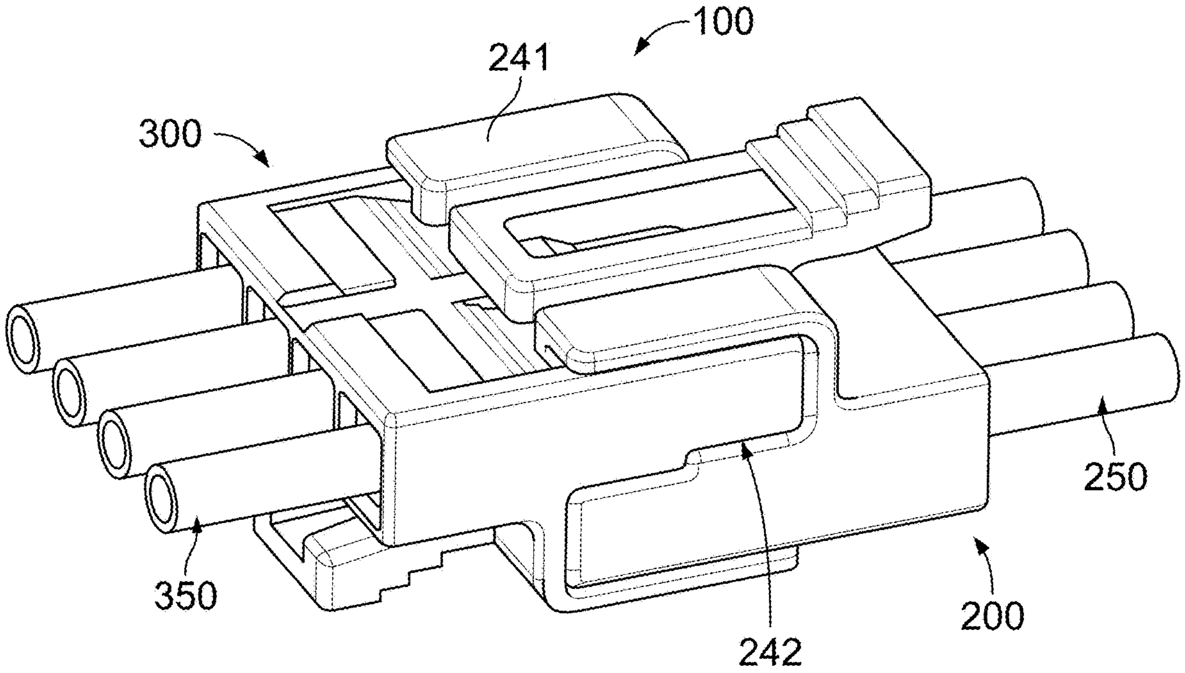
FIG. 13 illustrates the electrical connector system showing the first and second electrical connectors in a mated state in accordance with an exemplary embodiment.

FIG. 13 illustrates the electrical connector system 100 showing the first and second electrical connectors 200, 300 in a mated state. When mated, the upper wall 241 is configured to be plugged into the mating slot of the second electrical connector 300. The mating slot 242 is configured to receive a portion of the second electrical connector 300. The terminal assemblies 250 are configured to be mated with the terminal assemblies 350 of the second electrical connector 300. The latches latchably secure the first and second electrical connectors 200, 300.

Figure 14:
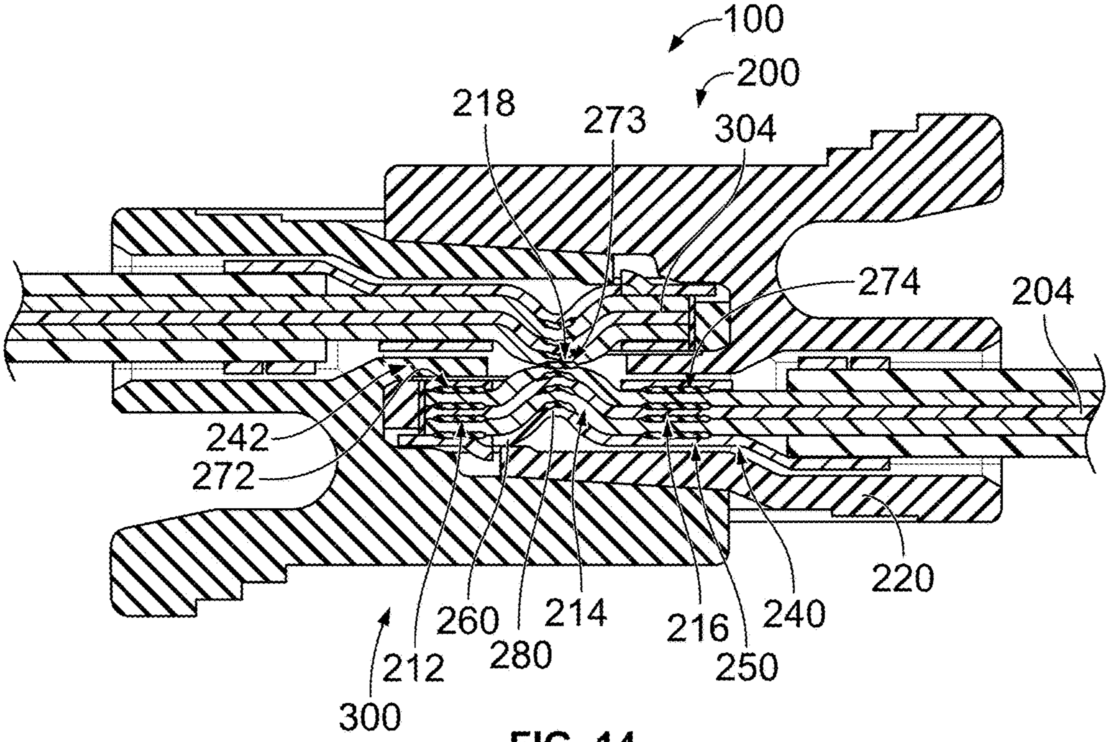
FIG. 14 is a cross-sectional view of the electrical connector system showing the first and second electrical connectors in a mated state in accordance with an exemplary embodiment.
Figure 15:
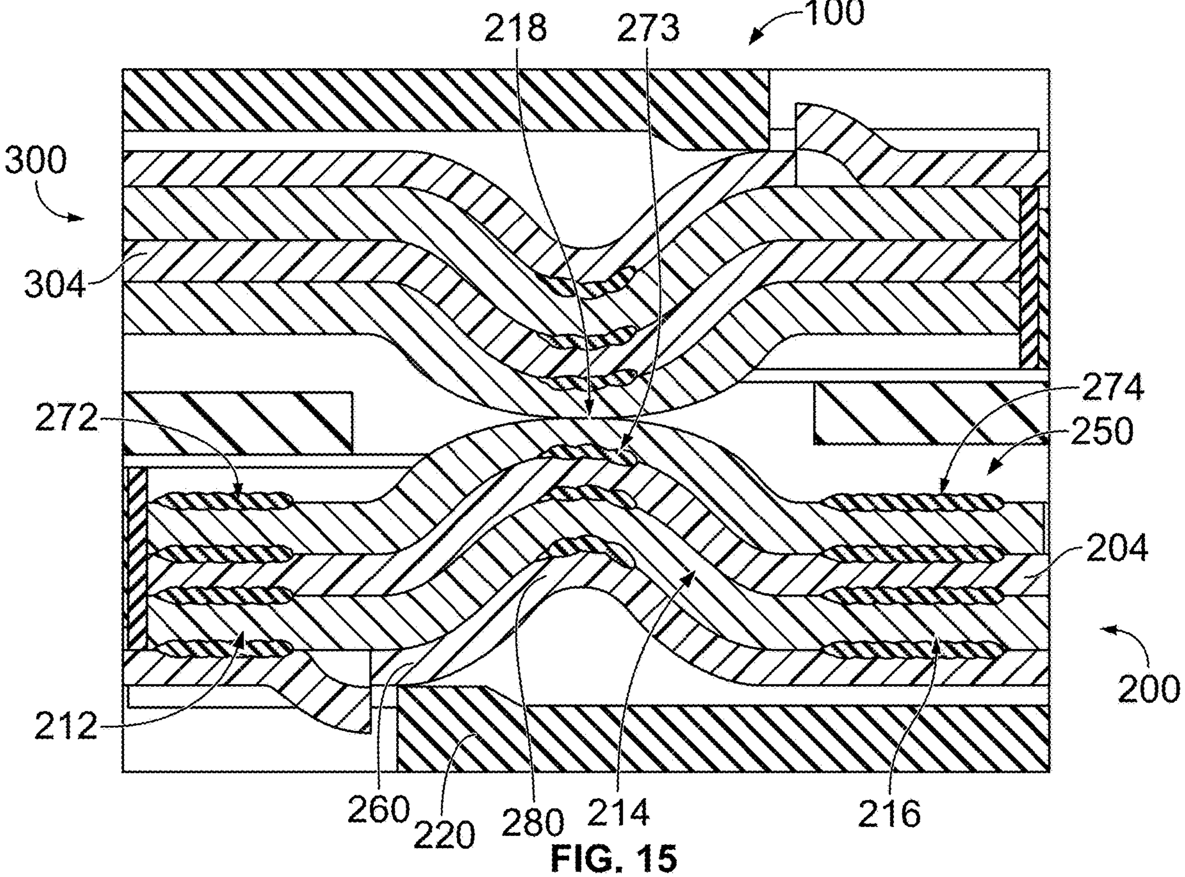
FIG. 15 is an enlarged, cross-sectional view of the electrical connector system showing the first and second electrical connectors in a mated state in accordance with an exemplary embodiment.

FIG. 14 is a cross-sectional view of the electrical connector system 100 showing the first and second electrical connectors 200, 300 in a mated state. FIG. 15 is an enlarged, cross-sectional view of the electrical connector system 100 showing the first and second electrical connectors 200, 300 in a mated state.

When assembled, the terminal assembly 250 is loaded into the terminal channel 240 of the housing 220. The mating interface 218 of the conductor 204 is located in the mating slot 242 for mating with the conductor 304 of the second electrical connector 300. The terminal 260 provides mechanical support for the conductor 204. For example, the front and rear weld pad 272, 274 secure the conductor 204 at the front and rear portions 212, 216. The central weld pad 273 secures the mating portion 214 of the conductor 204. The wire support 280 (for example, the arch 289) supports and positions the cable 202 at the mating interface. The terminal 260 may provide a normal force pressing outward against the cable 202 to press the cable 202 outward at the mating interface for mating with the cable 302 of the second electrical connector 300. For example, the terminal 260 provides mechanical support for the cable 202. In various embodiments, the terminal 260 may be flexible and is configured to be partially compressed or deflected inward when the terminal assembly 250 is mated to the terminal assembly 350 of the second electrical connector 300 to create an internal biasing force configured to bias the cable 202 outward at the mating interface for direct interfacing with the cable 302 of the second electrical connector 300.

The terminal 260 may be a low cost terminal, such as manufactured from a low cost material, such as stainless steel rather than copper because the terminal 260 does not need to form the electrical connection or electrical interface, but rather is used for mechanical support. The mating portion 214 defines the electrical mating interface 218 and is configured to be directly electrically connected to the mating portion of the conductor 304 of the second electrical connector 300. The mating interface 218 at the mating portion 214 of the conductor 204 is a separable mating interface. The mating interface 218 at the mating portion 214 of the conductor 204 may be a wiping mating interface configured to wipe along the mating portion of the conductor 304 during mating.

Figure 16:
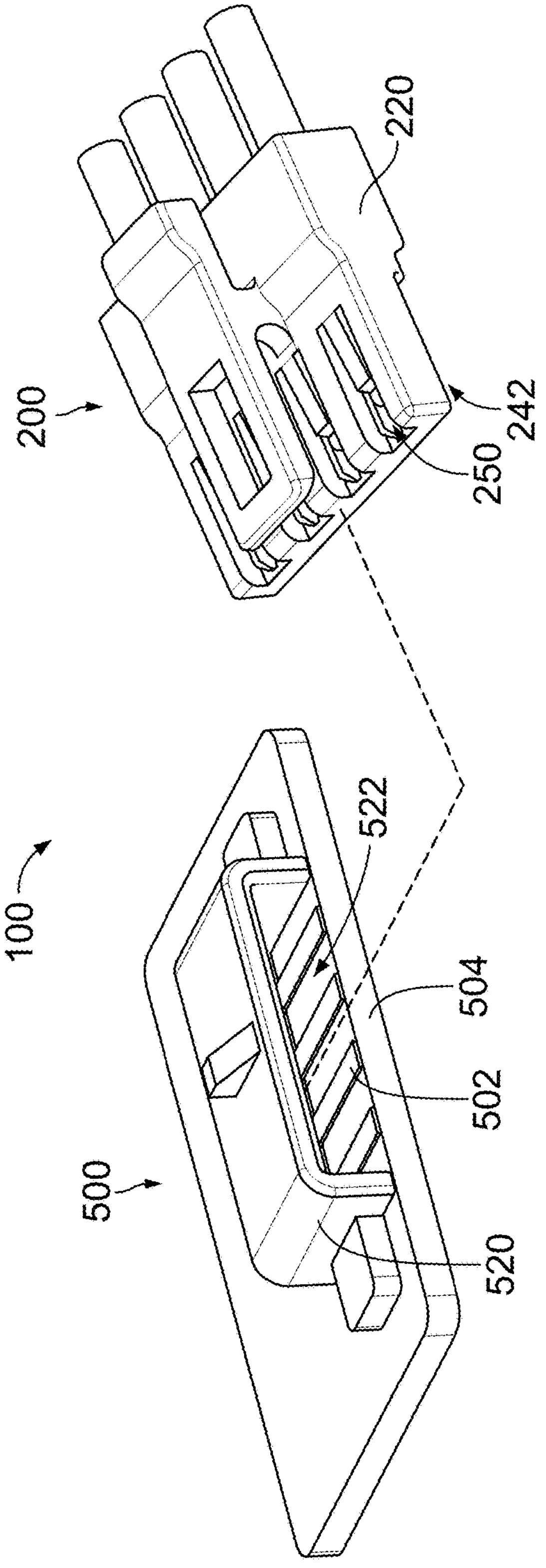
FIG. 16 illustrates the electrical connector system showing the first electrical connector poised for mating with the mating component in accordance with an exemplary embodiment.
Figure 17:
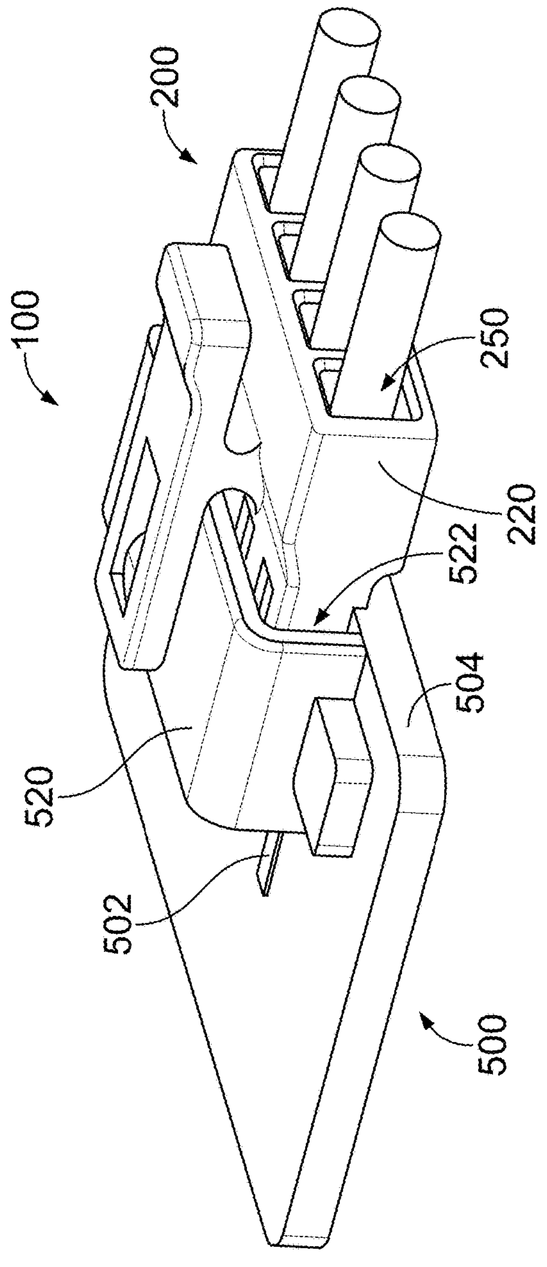
FIG. 17 illustrates the electrical connector system showing the first electrical connector mated with the mating component in accordance with an exemplary embodiment.

FIG. 16 illustrates the electrical connector system 100 showing the first electrical connector 200 poised for mating with the mating component. FIG. 17 illustrates the electrical connector system 100 showing the first electrical connector 200 mated with the mating component. In the illustrated embodiment, the mating component includes a circuit board 500 having contact pads 502 at an edge 504 of the circuit board 500. A connector housing 520 is mounted to the circuit board 500 and has a cavity 522 that receives the first electrical connector 200. For example, the housing 220 of the first electrical connector 200 is plugged into the cavity 522 to mate the terminal assemblies 250 to the contact pads 502. The edge 504 of the circuit board 500 may be plugged into the mating slot 242. In various embodiments, one of the walls (for example, the lower wall) may be removed such that the mating slot 242 is open at the bottom.

Figure 18:
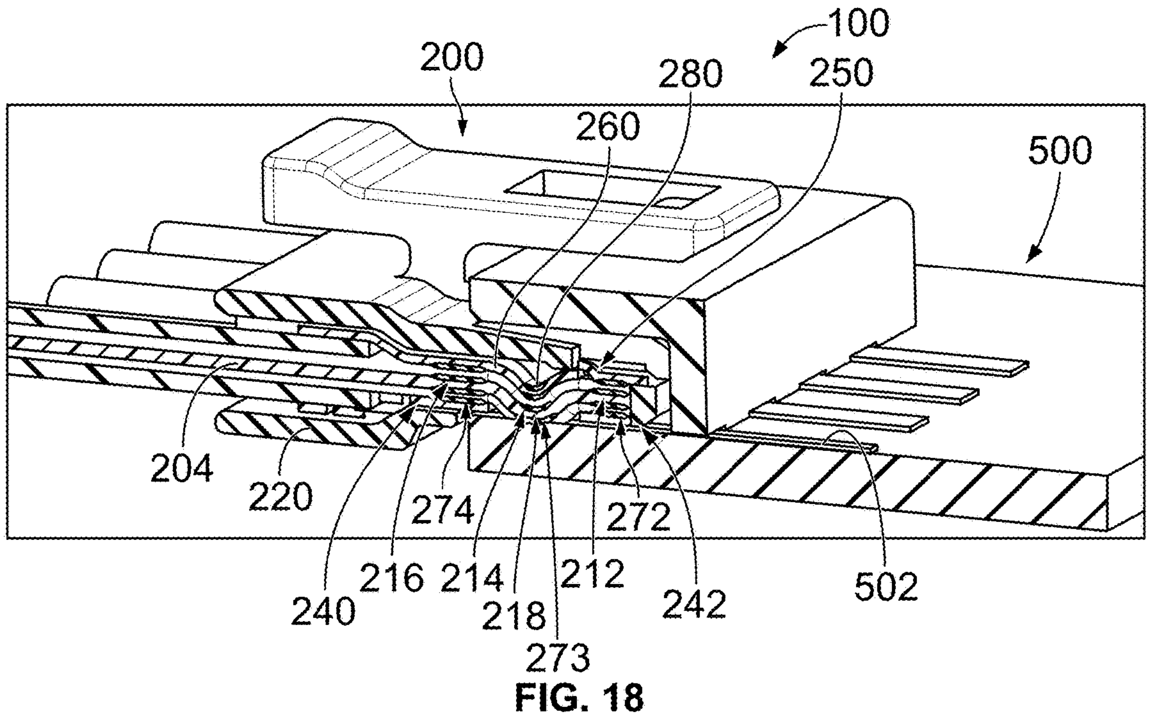
FIG. 18 is a cross-sectional view of the electrical connector system showing the first electrical connector mated with the mating component in accordance with an exemplary embodiment.
Figure 19:
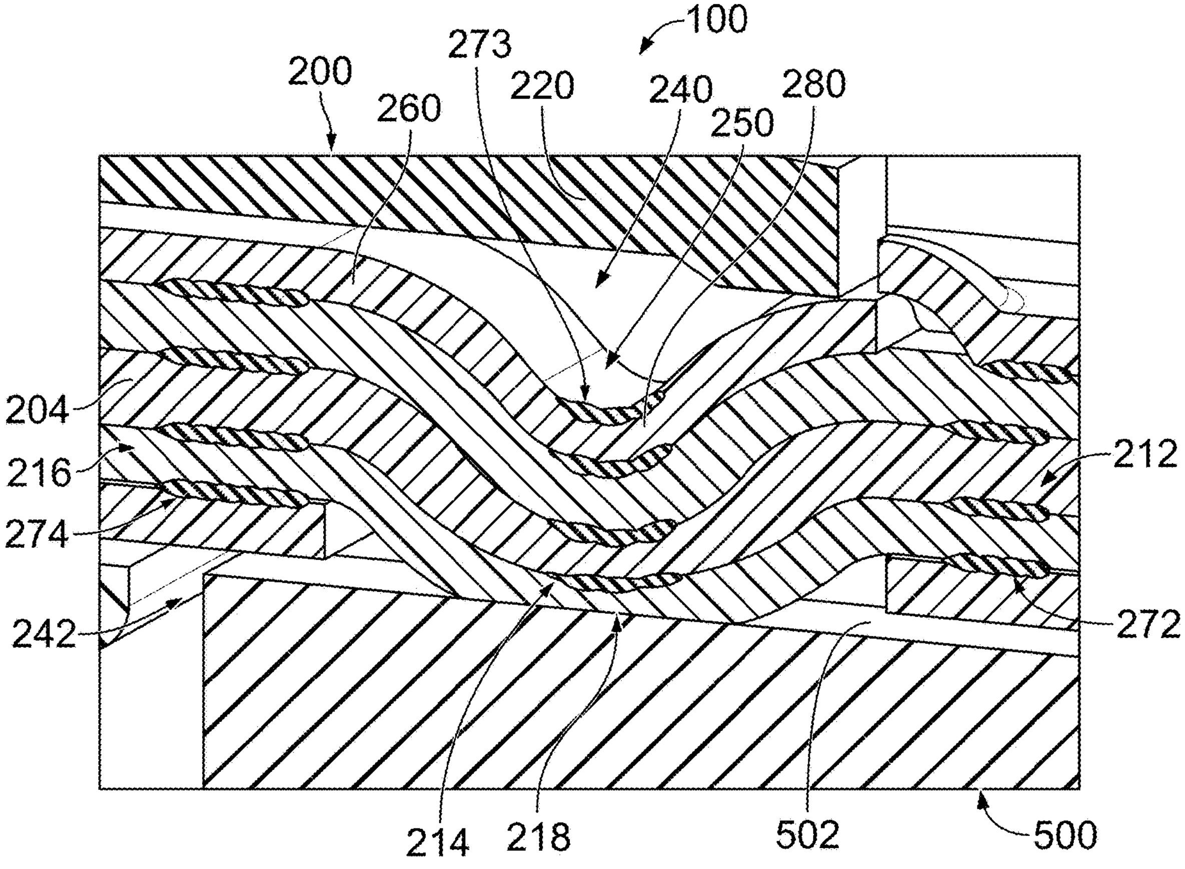
FIG. 19 is an enlarged, cross-sectional view of the electrical connector system showing the first electrical connector mated with the mating component in accordance with an exemplary embodiment.

FIG. 18 is a cross-sectional view of the electrical connector system 100 showing the first electrical connector 200 mated with the mating component. FIG. 19 is an enlarged, cross-sectional view of the electrical connector system 100 showing the first electrical connector 200 mated with the mating component.

When assembled, the terminal assembly 250 is loaded into the terminal channel 240 of the housing 220. The mating interface 218 of the conductor 204 is located in the mating slot 242 for mating with the contact pad 502 of the circuit board 500. The terminal 260 provides mechanical support for the conductor 204. For example, the front and rear weld pads 272, 274 secure the conductor 204 at the front and rear portions 212, 216. The central weld pad 273 secures the mating portion 214 of the conductor 204. The wire support 280 (for example, the arch 289) supports and positions the cable 202 at the mating interface. The terminal 260 may provide a normal force pressing outward against the cable 202 to press the cable 202 outward at the mating interface for mating with the cable 302 of the second electrical connector 300. For example, the terminal 260 provides mechanical support for the cable 202. In various embodiments, the terminal 260 may be flexible and is configured to be partially compressed or deflected inward when the terminal assembly 250 is mated to the terminal assembly 350 of the second electrical connector 300 to create an internal biasing force configured to bias the cable 202 outward at the mating interface for direct interfacing with the cable 302 of the second electrical connector 300.

The terminal 260 may be a low cost terminal, such as manufactured from a low cost material, such as stainless steel rather than copper because the terminal 260 does not need to form the electrical connection or electrical interface, but rather is used for mechanical support. The mating portion 214 defines the electrical mating interface 218 and is configured to be directly electrically connected to the contact pad 502 of the circuit board 500. The mating interface 218 at the mating portion 214 of the conductor 204 is a separable mating interface. The mating interface 218 at the mating portion 214 of the conductor 204 may be a wiping mating interface configured to wipe along the contact pad 502 of the circuit board 500 during mating.

Figure 20:
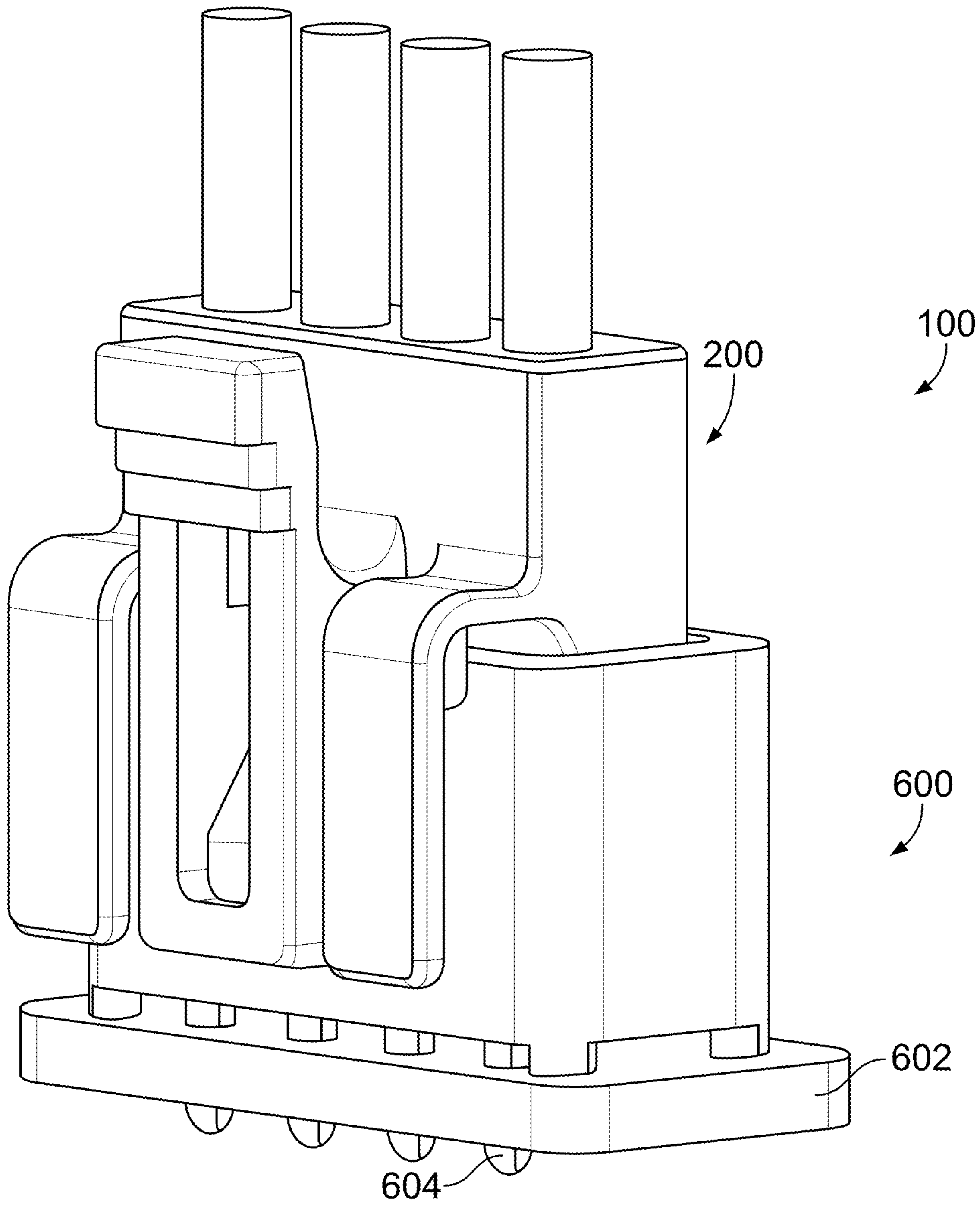
FIG. 20 illustrates the electrical connector system showing the first electrical connector mated with the mating component in accordance with an exemplary embodiment.

FIG. 20 illustrates the electrical connector system 100 showing the first electrical connector 200 mated with the mating component. In the illustrated embodiment, the mating component includes an electrical connector 600 coupled to a circuit board 602. The electrical connector 600 includes contacts 604 terminated to the circuit board 602. The electrical connector 600 may be a receptacle connector. The first electrical connector 200 is configured to be plugged into the housing of the electrical connector 600 to mated with the contacts 604.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A terminal assembly for an electrical connector configured to be mated with a mating electrical connector, the terminal assembly comprising:

a cable including a conductor having at least one wire, the conductor having an outer surface; and a terminal having a main body extending between a front and a rear of the terminal, the terminal including a wire support supporting the at least one wire of the conductor at a mating interface, the at least one wire being welded to the wire support to fix the at least one wire to the main body of the terminal;

wherein the outer surface of the conductor is exposed at the mating interface for direct mating to a mating component of the mating electrical connector.

2. The terminal assembly of claim 1, wherein the at least one wire is exposed at the mating interface for direct mating of the conductor to the mating component.

3. The terminal assembly of claim 1, wherein the wire support includes a weld pad, the at least one wire being welded to the weld pad.

4. The terminal assembly of claim 1, wherein the wire support includes a front weld pad and a rear weld pad, the at least one wire being welded to the front weld pad and the rear weld pad, the mating interface located between the front weld pad and the rear weld pad.

5. The terminal assembly of claim 1, wherein the at least one wire is welded to the wire support at the mating interface.

6. The terminal assembly of claim 1, wherein the main body includes a front wire crimp and a rear wire crimp, the wire support located between the front wire crimp and the rear wire crimp, the front and rear wire crimps being crimped to the at least one wire forward and rearward of the mating interface.

7. The terminal assembly of claim 1, wherein the wire support includes a trough with curved side walls holding the at least one wire.

8. The terminal assembly of claim 1, wherein the wire support includes a front base supporting the conductor at the front of the terminal and a rear base supporting the conductor at the rear of the terminal, the mating interface located between the front base and the rear base, the at least one wire being welded to the main body at the front base and the rear base.

9. The terminal assembly of claim 8, wherein the wire support includes an elevated platform supporting the conductor at an elevated position relative to the front base and the rear base.

10. The terminal assembly of claim 1, wherein the wire support includes an arch supporting the at least one wire, the arch having an arcuate shape.

11. The terminal assembly of claim 1, wherein the at least one wire is ultrasonically welded to the main body of the terminal.

12. The terminal assembly of claim 1, wherein the at least one wire includes a first wire and a second wire, the first wire being welded to the second wire.

13. The terminal assembly of claim 1, wherein the at least one wire includes a plurality of wires internested at the mating interface.

14. The terminal assembly of claim 1, wherein the terminal is manufactured from stainless steel.

15. The terminal assembly of claim 14, wherein the terminal assembly has a conductivity of greater than $3.0\times10^7$ S/m at 20° C.

16. The terminal assembly of claim 1, wherein the terminal has a conductivity of less than 30 IACS.

17. The terminal assembly of claim 1, wherein the main body of the terminal is outside of the mating interface, the main body configured to not interface with the mating component.

18. A terminal assembly comprising:

a cable including a conductor having at least one wire, the conductor including a front portion, a rear portion, and a mating portion between the front portion and the rear portion; and a terminal having a main body extending between a front and a rear of the terminal, the terminal including a front weld pad welded to the front portion of the conductor, the terminal including a rear weld pad welded to the rear portion of the conductor, the terminal including a wire support supporting the mating portion of the conductor at a mating interface;

wherein the mating portion of the conductor is exposed at the mating interface for direct mating to a mating component.

19. An electrical connector configured to be mated to a mating electrical connector, the electrical connector comprising:

a housing having a mating end configured to be mated with a mating component of the mating electrical connector and a cable end, the housing including a contact channel therethrough; and a terminal assembly coupled to the housing, the terminal assembly including a cable and a terminal coupled to the cable, the cable including a conductor having at least one wire, the terminal having a main body extending between a front and a rear of the terminal, the terminal including a wire support supporting the at least one wire of the conductor at a mating interface, the at least one wire being welded to the wire support to fix the at least one wire to the main body of the terminal, wherein the conductor is exposed at the mating interface for direct mating to the mating component of the mating electrical connector.

20. The electrical connector of claim 19, wherein the housing includes a mating slot configured to receive the mating component, the mating interface exposed within the mating slot for mating with the mating component.

* * * * *